June 12, 1951 R. C. BERGH ET AL 2,556,672
NUT
Filed Dec. 27, 1944
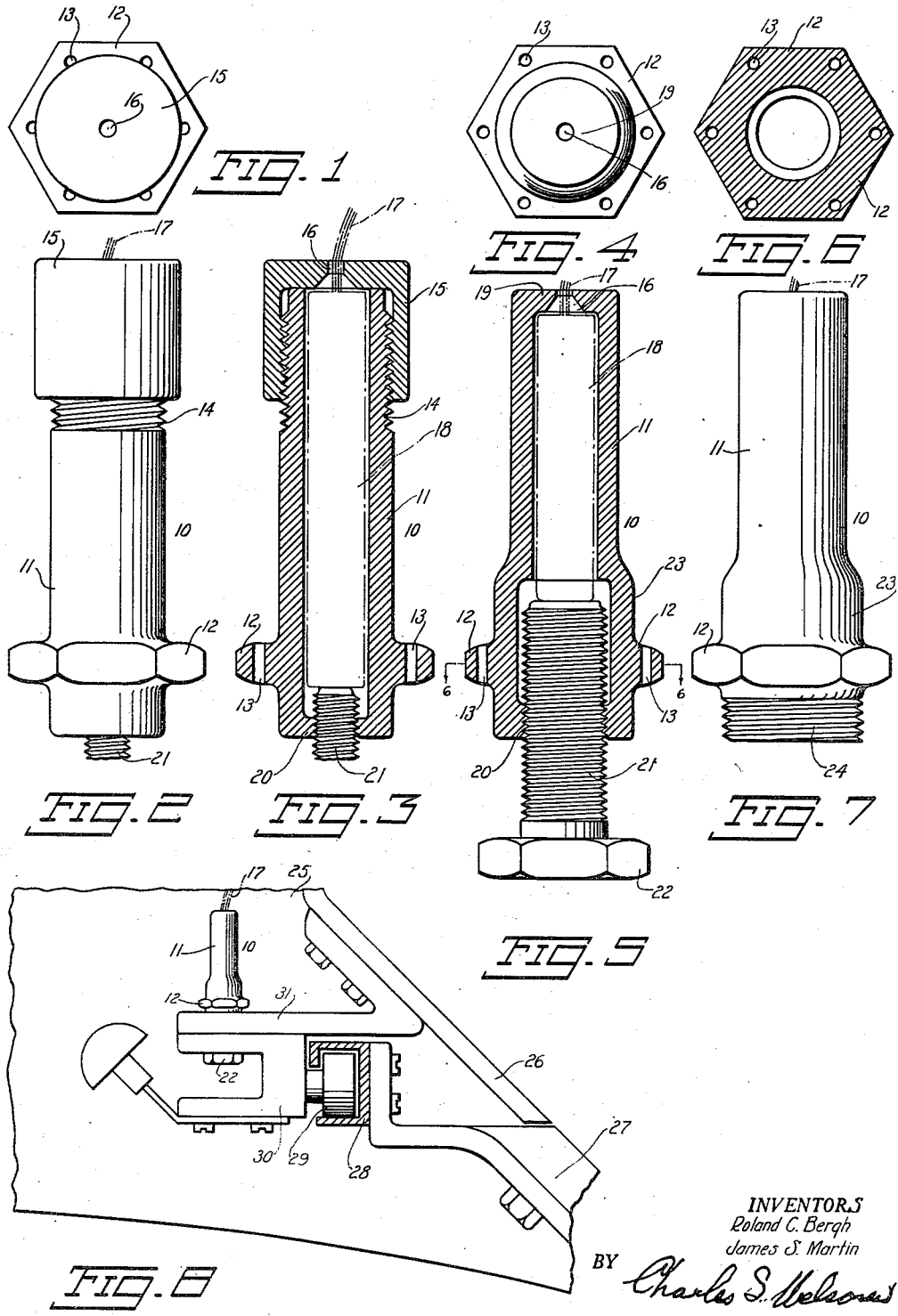
INVENTORS
Roland C. Bergh
James S. Martin
BY Charles S. Nelson
ATTORNEY Patented June 12, 1951

2,556,672

UNITED STATES PATENT OFFICE 2,556,672

NUT

Roland Christian Bergh, Cedarhurst, and James S. Martin, Huntington Station, N. Y., assignors to Republic Aviation Corporation, Farmingdale, N. Y., a corporation of Delaware Application December 27, 1944, Serial No. 570,005

5 Claims. (Cl. 85—32)

This invention relates to nuts for cooperation with standard bolts in the conventional manner and has for its object a nut construction which will incorporate means for the instantaneous release and disengagement of the bolt from the nut.

To that end the present invention contemplates a nut having a body which constitutes a housing or container for the reception of an explosive charge which is so situated in, and housed by, the nut that the explosive force upon the firing of said charge is confined and concentrated to act directly upon the bolt and thereby so sever, strip or mutilate the interengaging threads of the nut and bolt that their mutual engagement is instantly terminated.

Among its other objects the present invention enables the assembly and use of a plurality of nuts and their coacting bolts whereby the simultaneous disengagement and separation of the nuts from the bolts is accomplished by the concurrent firing of the individual explosive charges housed and contained in the several nuts so employed.

With the above and other objects in view as will be apparent, this invention consists in the construction, combination and arrangement of parts all as hereinafter more fully described, claimed and illustrated in the accompanying drawings, wherein:

Fig. 1 is a top plan view of the present nut;

Fig. 2 is a side elevation thereof;

Fig. 3 is a central longitudinal sectional view of the nut and a portion of its coacting bolt;

Fig. 4 is a top plan view of a modified form of the instant nut;

Fig. 5 is a central longitudinal section through this modified nut showing the coacting bolt in elevation;

Fig. 6 is a horizontal section taken along line 6—6 of Fig. 5, with the bolt removed;

Fig. 7 is an elevation of a further modification of that form of the invention disclosed in Fig. 5; and Fig. 8 shows the present invention employed in attaching a jettisonable canopy of an aircraft to its supporting structure or to the fuselage.

In the drawings, 10 designates generally the nut constituting the principal feature of this invention, which consists primarily of an elongated, hollow body 11 of any desirable cross-sectional shape, here shown as circular. At or adjacent its inner or engaging end the body 11 is provided with an outstanding faced collar or flange 12 by which the nut as a unit may be manipulated in being threaded home on, or in being removed from, a coacting bolt in the conventional manner. This flange or collar 12 may be provided with the standard lock wire apertures 13, if desired.

In that form of the invention shown in Figs. 1 to 3 inc., the outer end of the body 11 is open and is exteriorly threaded, as at 14. An internally threaded cap 15, closed at its outer end, embraces the outer end of the body 11 and cooperates with the threads 14 thereof to seal its open end. This cap 15 has a central or axial aperture 16 to permit the passage of the firing wires 17 of a cartridge 18 housed within the body 11, as will be described.

No cap 15 is employed in that form of the invention disclosed in Figs. 4 to 7 inclusive. Here the outer end of the body is provided with an integral end wall 19, having a central aperture 16, similar in all respects to, and for the same purpose as, the aperture 16 of the cap 15.

The inner or engaging end of the body 11, in all forms of the invention, is provided with an inwardly projecting lateral flange or end 20 which is threaded at its edge for cooperation with the threaded stem 21 of the conventional bolt 22. This flange or end 20 of the body 11 is opposed to the cap 15 of that form of the invention shown in Fig. 3 and to the end wall 19 of the body 11 in that form of the invention shown in Fig. 5, and has only a thickness sufficient to provide enough threads on its inner edge to engage the threads of the bolt and securely hold the nut 10 in place thereon and for the bolt and coacting nut to properly function as a securing means against normal or usual forces.

It will be observed from Fig. 3 that the passage through or defined by the end 20 is smaller than the bore of the body 11 of the nut. Therefore, since the cartridge 18 must substantially fill the bore of the body 11, it is to be inserted from the outer end thereof after which the cap 15 is placed thereon and threaded home. This form of the invention is designed to cooperate with bolts having stems 21 of relatively small diameter. On the other hand in that form of the invention shown in Fig. 5, designed to cooperate with bolt stems 21 of relatively large diameters, the cartridge 18 may be inserted in the bore of the body 11 through the apertured end 20 thereof. In both cases, however, the number of threads on the nut engaging the threads on the bolt stem 21 is small when compared to the threaded interengagement of the standard conventional nut and its bolt.

Since the nut shown in Figs. 5 and 7 is intended to coact with a bolt stem 21 of relatively large diameter the inner or engaging end of the body 11 is enlarged, as at 23, where there is no increase in the diameter of the cartridge 18. It is to be understood, however, that this enlargement is not an essential feature of this invention.

The cartridge 18 is of any suitable form which may be fired by closing an electric circuit and its construction per se forms no part of this invention. It is designed to completely fill the bore of the body 11 and to substantially abut the inner end of the coacting bolt stem 21 upon the final adjustment of the nut 10 thereon. When the charge within the cartridge 18 is fired by closing the circuit including the firing wires 17, the explosive force is exerted between the cap 15 and the inner end of the bolt stem 21 or between the end wall 19 of the body 11 of the inner end of the bolt stem 21 depending on which form of the invention is used. In either event this explosive charge shears, severs, or strips the threads on the flange or end 20 of the nut 10 and thereby permits a separation of the bolt and nut without employing the threaded cooperation of the nut and bolt in the conventional manner.

In all forms of the invention the firing wires 17 exit from the body 11 of the nut through the aperture 16 either in the cap 15 or in the end wall 19 after positioning the cartridge 18 within the body 11 as above described.

Thus assembled, the nut 10 constitutes a structure coacting with a bolt 22 to releasably fasten or secure several elements one to the other in the conventional manner. However, if and when it is necessary or desirable to instantaneously release the secured elements one from the other by ending the cooperative engagement of the nut 10 and its coacting bolt 22, without resorting to the threaded cooperation thereof, the passing of an electrical current through the firing wires 17, detonates the cartridge 18 thereby directing and concentrating an explosive force on the end of the bolt stem 21, stripping the threads by which it is engaged by the body 11 of the nut.

A further modification of the structure of the nut 10 is disclosed in Fig. 7 wherein the body 11 is exteriorly threaded as at 24, at its inner or engaging end to coact with threads of an opening in the adjacent structure or element, thereby firmly anchoring the nut against independent movement. Thus, when the cartridge 18 is detonated, the bolt 22 will be forced downwardly and outwardly from its engagement by the nut 10 and the latter remains fixed to the element to which it is secured by the threads 24.

The nut 10 may be used in connection with bolts employed in the mounting of closures, canopies, spin chutes, external or auxiliary gas tanks and bombs in aircraft and for the attachment and release of any other attached structure where the immediate release thereof may be desired.

One of the many uses and adaptations of the present invention is illustrated in Fig. 8 where the device is employed on bolts by which the jettisonable canopy of an aircraft is secured to the fuselage or to a sliding or reciprocable carriage interposed between the fuselage and the canopy. Here the fuselage 27 is provided with a track 28 upon each side of the cockpit. The canopy 25, having a metallic skirt 26 at its edges, is mounted for reciprocation in a fore-and-aft direction relative to the fuselage 27 and above the cockpit, by means of two or more brackets 31 attached to and extending inwardly from the skirt 26. Each bracket 31 is secured and attached to the upper surface of a fitting or carriage 30 by means of one or more bolts 22 which pierce both the fitting 30 and the bracket 31, on each of which is threaded a nut 10 constructed in accordance with the present invention. The fitting 30 carries a roller 29 which operates on and within the track 28. In the event the canopy is mounted for reciprocation, as more or less schematically shown in Fig. 8, there are two or more of the fittings 30 and coacting brackets 31, each set of which is secured together as above described. The firing wires 17 of the cartridges 18 within the body 11 of each nut all terminate in a common switch (not shown). The closing of this switch causes all of the cartridges 18 of the several nuts 10 to be simultaneously exploded or detonated thereby simultaneously and instantaneously separating the nuts 10 from their cooperating bolts 22. In this manner the canopy is entirely freed from its attachment to the fuselage 27 and can be disengaged and jettisoned.

Should the form of nut 10 shown in Fig. 7 be employed, the nut will remain secured to the bracket 31, while the bolt 22 will be moved downwardly under the explosive force. On the other hand should that form of the invention shown in Figs. 3 and 5 be employed, the release of the interengaging threads of the nuts 10 and bolts 22 by the explosive forces will cause the nut 10 to move in one direction and the bolt 22 in the opposite direction, unless the bolt is also threaded into the fitting 30. In any event, there is a complete severance of locking interengagement between the nut 10 and the bolt 22 by the action of the simultaneous firing of the several charges of the assembly.

The advantages of the present invention, used as shown in Fig. 8, are manifest when it is understood that complicated and extensive mechanisms have been heretofore employed for the release of the canopy, all of which have added weight to the aircraft and have been generally unsatisfactory because of their tendency to fail or bind and the difficulty of insuring a complete release by such mechanisms at all mounting points at the same time.

The instant invention may also be adapted to a fixed or immovable canopy where the full equivalent of the rollers 29 and tracks 28 of the structure shown in Fig. 8 would be the fitting 30 or its equivalent fixedly attached to or forming a part of the fuselage 27.

Manifestly the present nut may be utilized in a variety of installations since its use may be said to be indicated wherever a standard bolt and nut can be used and where it is desired to obtain an instantaneous disengagement of the nut from the bolt.

It is desirable, in order to use the present nut with standard bolts, to always strip the threads of the nut under the impact of the explosive force and at the same time maintain solid interengagement between the bolt and nut. To that end the threads of the nuts are confined to the inner or engaging end of the nut and are limited in extent being only sufficient to maintain interengagement between the bolt and nut under normal conditions.

The design and construction of the nut is such that the cartridge 18 is so housed within the nut that the accidental detonation thereof will not set up sympathetic detonations of cartridges similarly housed and situated in the immediate vicinity of such accidental detonation.

What is claimed is:

1. A nut for cooperation with a threaded bolt comprising an elongated hollow body to receive an explosive cartridge having firing wires, a closure for one end of said body having a relatively small aperture therein for the passage of the firing wires of the cartridge, and a lateral flange extending inwardly from the opposite end of said body and threaded at its edge for cooperation with the threads of the coacting bolt.

2. A nut for cooperation with a threaded bolt comprising an elongated hollow body to receive an explosive cartridge having firing wires, a closure at one end of said body having a relatively small aperture therein for the passage of the firing wires of the cartridge, a lateral flange associated with and extending inwardly from the opposite end of said body and threaded at its edge for cooperation with the threads of the coacting bolt, and an external faced collar secured to and projecting from said body.

3. The combination with a threaded bolt, of a nut cooperating therewith comprising a hollow body having a relatively thin internal flange at one of its ends, a closure at the other of its ends and threads on said flange for coaction with the threads of the bolt, an explosive charge housed in said body between and in substantial contact with said closure and the extremity of the bolt, and means for detonating said charge to thereby shear the threads of the flange and bolt and release the bolt from engagement by the nut.

4. The combination with a threaded bolt, of a nut cooperating therewith comprising a hollow body adapted to receive the threaded shank of the bolt, having a relatively thin internal flange at one of its ends, a closure at the other of its ends and threads on said flange for coaction with threads of the bolt, an explosive charge housed in said body between and in substantial contact with said closure and the extremity of the bolt positioned in the body, means for detonating said charge to thereby strip the threads of the flange aforesaid, and external engaging means on the body for the axial rotation thereof relative to the bolt.

5. The combination with a threaded bolt, of a nut coacting therewith comprising a hollow body having a relatively thin internal flange at one of its ends, a closure at the other of its ends and threads on said flange for cooperation with threads of the bolt, an explosive charge housed in said body between and in substantial contact with said closure and the extremity of the bolt, external threads on said body at the end thereof having the internal flange aforesaid whereby the body may be anchored to a support, and means whereby said charge may be detonated to strip the coacting threads on said flange and force the bolt outwardly of the anchored body.

ROLAND CHRISTIAN BERGH.
JAMES S. MARTIN.

REFERENCES CITED

The following references are of record in the file of this patent:

UNITED STATES PATENTS

| Number | Name | Date |
|---|---|---|
| 425,786 | Hansen | Apr. 15, 1890 |
| 718,959 | Wilson | Jan. 20, 1903 |
| 1,131,085 | Reilly | Mar. 9, 1915 |
| 1,324,867 | Wilson | Dec. 16, 1919 |
| 1,370,474 | Newsom | Mar. 1, 1921 |
| 1,375,440 | Anthony | Apr. 19, 1921 |
| 1,400,401 | Allan | Dec. 13, 1921 |
| 1,458,925 | Barab | June 19, 1923 |
| 1,470,271 | Burn | Oct. 9, 1923 |
| 1,977,861 | Pond | Oct. 23, 1934 |
| 2,062,912 | Kneeland | Dec. 1, 1936 |
| 2,302,280 | Warren | Nov. 17, 1942 |
| 2,401,202 | Tinnerman | May 28, 1946 |

FOREIGN PATENTS

| Number | Country | Date |
|---|---|---|
| 24,944 | Great Britain | Nov. 6, 1906 |
| 875,292 | France | June 15, 1942 |